(12) United States Patent
Komada

(10) Patent No.: US 10,407,122 B2
(45) Date of Patent: Sep. 10, 2019

(54) BICYCLE OPERATING DEVICE

(71) Applicant: Shimano Inc., Sakai, Osaka (JP)

(72) Inventor: Yasuyuki Komada, Osaka (JP)

(73) Assignee: Shimano Inc., Osaka (JP)

( * ) Notice: Subject to any disclaimer, the term of this patent is extended or adjusted under 35 U.S.C. 154(b) by 632 days.

(21) Appl. No.: 15/138,092

(22) Filed: Apr. 25, 2016

(65) Prior Publication Data

US 2017/0305493 A1 Oct. 26, 2017

(51) Int. Cl.
*B62L 3/02* (2006.01)
*B62K 23/06* (2006.01)
*B62M 25/08* (2006.01)

(52) U.S. Cl.
CPC ............ *B62K 23/06* (2013.01); *B62L 3/02* (2013.01); *B62L 3/023* (2013.01); *B62M 25/08* (2013.01)

(58) Field of Classification Search
CPC . B60T 7/102; B62K 23/06; B62L 3/02; B62L 3/023; B62M 25/08
See application file for complete search history.

(56) References Cited

U.S. PATENT DOCUMENTS

| 2009/0049945 | A1 | 2/2009 | Weiher | |
| 2015/0274252 | A1* | 10/2015 | Nishino | B62L 3/023 92/161 |
| 2015/0336629 | A1* | 11/2015 | Ruopp | B60T 7/102 60/562 |

* cited by examiner

*Primary Examiner* — Abiy Teka
(74) *Attorney, Agent, or Firm* — Global IP Counselors, LLP

(57) ABSTRACT

A bicycle operating device is basically provided with a bracket, an operating member, an actuation cam and a biasing element. The bracket is configured to be coupled to a handlebar. The operating member is pivotally mounted to the bracket about a first axis. The actuation cam is pivotally mounted to the bracket about a second axis. The biasing element includes a coil portion disposed around a third axis that is offset from the first axis. The biasing element biases the operating member relative to the bracket about the first axis toward the actuation cam. The biasing element biases the actuation cam relative to the bracket about the second axis toward the operating member.

16 Claims, 8 Drawing Sheets

BICYCLE OPERATING DEVICE

BACKGROUND

Field of the Invention

This invention generally relates to a bicycle operating device. More specifically, the present invention relates to a bicycle operating device for operating a bicycle component.

Background Information

Most bicycles are provided with one or more bicycle operating devices to operate various bicycle components to perform such functions as shifting gears and braking. Typically, the bicycle operating devices are provided on a handlebar of the bicycle. When the bicycle operating device is installed on the handlebar, the bicycle operating device will have a different configuration depending on the type of handlebar. In the past, most bicycles used cables to interconnect the bicycle operating devices to the bicycle components. More recently, some bicycles have been provided with electrically operated bicycle components and/or hydraulically operated bicycle components. Thus, a bicycle operating device can be operatively connected to a bicycle component by a mechanical wire, an electrical wire or a hydraulic hose.

SUMMARY

Generally, the present disclosure is directed to various features of a bicycle operating device that is used to operate a bicycle component. While the bicycle operating device in the illustrated embodiment hydraulically operates a first component and electrically operates a second component, the bicycle operating device can be configured to only operate a single bicycle component and/or can be configured to mechanically operate one or two bicycle components.

In view of the state of the known technology and in accordance with a first aspect of the present disclosure, a bicycle operating device is provided that basically comprises a bracket, an operating member, an actuation cam and a biasing element. The bracket is configured to be coupled to a handlebar. The operating member is pivotally mounted to the bracket about a first axis. The actuation cam is pivotally mounted to the bracket about a second axis. The biasing element includes a coil portion disposed around a third axis that is offset from the first axis. The biasing element biases the operating member relative to the bracket about the first axis toward the actuation cam. The biasing element biases the actuation cam relative to the bracket about the second axis toward the operating member.

In accordance with a second aspect of the present invention, the bicycle operating device according to the first aspect is configured so that the second axis is coincident with the first axis.

In accordance with a third aspect of the present invention, the bicycle operating device according to the first or second aspect is configured so that the biasing element includes a first end portion extending from the coil portion and applying a first biasing force to the actuation cam, and a second end portion extending from the coil portion and applying a second biasing force to the operating member.

In accordance with a fourth aspect of the present invention, the bicycle operating device according to the third aspect is configured so that the first end portion of the biasing element contacts the actuation cam at a first portion that pivots the actuation cam about the second axis.

In accordance with a fifth aspect of the present invention, the bicycle operating device according to any one of the first to fourth aspects is configured so that the actuation cam contacts the operation member at a contact portion, and the first portion is farther from the contact portion than the first and second axes.

In accordance with a sixth aspect of the present invention, the bicycle operating device according to any one of the third or fifth aspect is configured so that the first end portion has a straight shape linearly extending from the coil portion.

In accordance with a seventh aspect of the present invention, the bicycle operating device according to any one of the third to sixth aspects is configured so that the second end portion of the biasing element contacts the operating member at a second portion that pivots the operating member about the first axis.

In accordance with an eighth aspect of the present invention, the bicycle operating device according to the seventh aspect is configured so that the second portion is farther from the first and second axes than the third axis.

In accordance with a ninth aspect of the present invention, the bicycle operating device according to the seventh or eighth aspect is configured so that the second portion includes a pin provided on the operating member.

In accordance with a tenth aspect of the present invention, the bicycle operating device according to the ninth aspect is configured so that the second end portion has a hook shape corresponding to the pin of the second portion.

In accordance with an eleventh aspect of the present invention, the bicycle operating device according to any one of the first to tenth aspects further comprises a piston that is operatively coupled to the operating member via the actuation cam, and that is movably disposed in a hydraulic chamber of the bracket in response to operation of the operating member.

In accordance with a twelfth aspect of the present invention, the bicycle operating device according to the eleventh aspect is configured so that the actuation cam is configured to move the piston in the hydraulic chamber in a direction towards the operating member.

In accordance with a thirteenth aspect of the present invention, the bicycle operating device according to any one of the first to twelfth aspects further comprises an adjustment member that is operatively coupled to the actuation cam to adjust a rest position of the actuation cam with respect to the operating member.

In accordance with a fourteenth aspect of the present invention, the bicycle operating device according to the thirteenth aspects is configured so that the adjustment member is screwed into one of the operating member and the actuation cam.

In accordance with a fifteenth aspect of the present invention, the bicycle operating device according to the fourteenth aspects is configured so that the adjustment member is screwed into the actuation cam.

In accordance with a sixteenth aspect of the present invention, the bicycle operating device according to any one of the first to fifteenth aspects is configured so that the bracket has a grip portion with a handlebar receiving recess, and the operating member is disposed at an opposite end of the grip portion from the handlebar receiving recess.

In accordance with a seventeenth aspect of the present invention, the bicycle operating device according to the sixteenth aspect is configured so that the bracket further has a pommel portion that is disposed at the opposite end of the grip portion from the handlebar receiving recess.

Also other objects, features, aspects and advantages of the disclosed bicycle operating device will become apparent to those skilled in the art from the following detailed description, which, taken in conjunction with the annexed drawings, discloses one illustrative embodiment of the bicycle operating device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
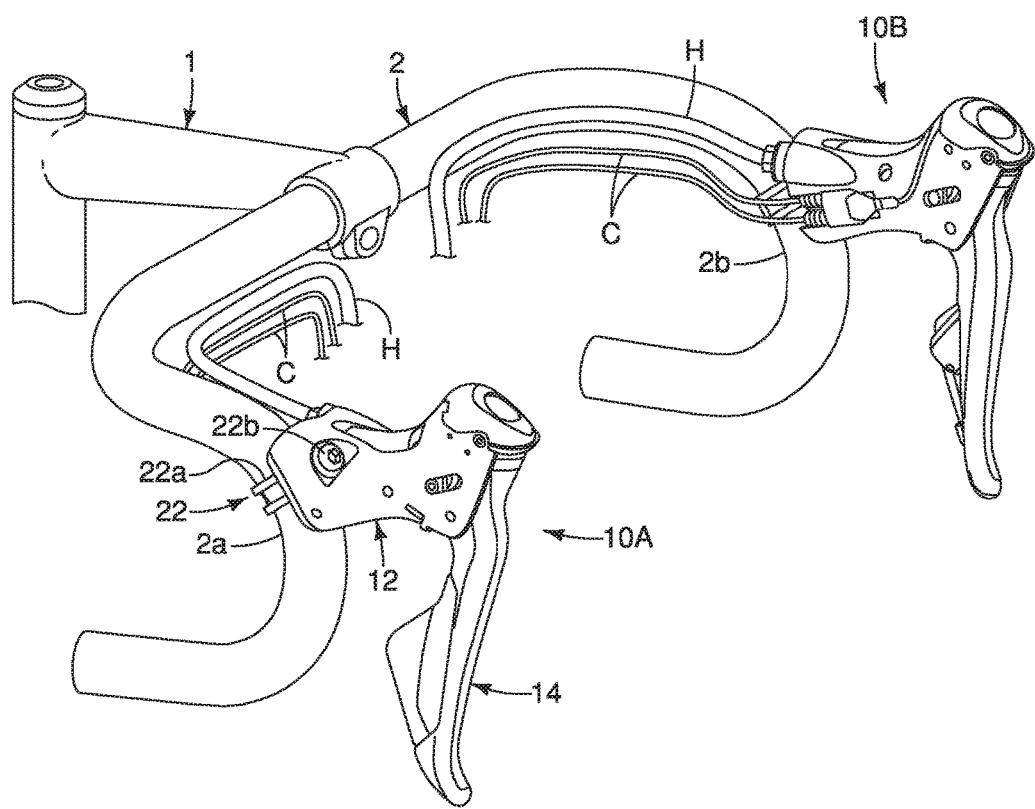
FIG. 1 is a partial front perspective view of a bicycle having a drop handlebar that is equipped with a pair of bicycle operating devices in accordance with a first embodiment.

Referring initially to FIG. 1, a portion of a bicycle 1 is illustrated having a handlebar 2 with a pair of bicycle operating devices 10A and 10B in accordance with a first embodiment. The bicycle operating devices 10A and 10B are configured to be mounted to opposite ends of the handlebar 2, respectively. Here in the first embodiment, the handlebar 2 is a drop handlebar in which the bicycle operating devices 10A and 10B are attached to curved sections 2a and 2b, respectively. Thus, each of the bicycle operating devices 10A and 10B is a drop handlebar operating device, which means that they are configured to be mounted to a curved section of a drop handlebar.

Basically, as seen in FIG. 1, the bicycle operating device 10A is a right bicycle operating device that is operated by the rider's right hand to actuate a first hydraulic brake device (not shown) and a first electric transmission (not shown). The bicycle operating device 10B is a left bicycle operating device that is operated by the rider's left hand to actuate a second hydraulic brake device (not shown) and a second electric transmission (not shown). The first and second electric transmission or gear shifting devices are part of a conventional bicycle driving system that is used to shift speed stages or gear stages of the drive train in a relatively conventional manner. Since the bicycle operating devices 10A and 10B are each configured to operate both a transmission and a brake device, the bicycle operating devices 10A and 10B are also known as bicycle brifters. In other words, a bicycle brifter is a device that includes both a braking function and a shifting function in a single unit that is mounted to the bicycle. However, the shifting functions of the bicycle operating devices 10A and 10B can be omitted if needed and/or desired. Thus, each of the bicycle operating devices 10A and 10B constitutes a brake operating device (i.e., a bicycle hydraulic component) that is fluidly connected to a hydraulic brake device.

The bicycle operating device 10A is operatively coupled to the first hydraulic brake device (not shown) via a hydraulic hose H, and to the first transmission (not shown) and a cycle computer (not shown) via electric control cables C. The bicycle operating device 10B is operatively coupled to the second hydraulic brake device (not shown) via a hydraulic hose H, and to the second transmission (not shown) and the cycle computer (not shown) via electric control cables C. The hydraulic hoses H are conventional hydraulic hose that are commonly used in the bicycle field. The electric control cables C are a conventional control cables that are commonly used in the bicycle field. The electric control cables C and the hydraulic hoses H can be routed along the exterior of the handlebar 2. Alternatively and preferably, the electric control cables C and the hydraulic hoses H are routed through the interior of the handlebar 2.

In the illustrated embodiment, the right and left bicycle operating devices 10A and 10B are essentially identical in operation, except that they are mirror images of each other and they may have a different number of shift operations. Thus, only the bicycle operating device 10A will be discussed and illustrated herein.

Figure 2:
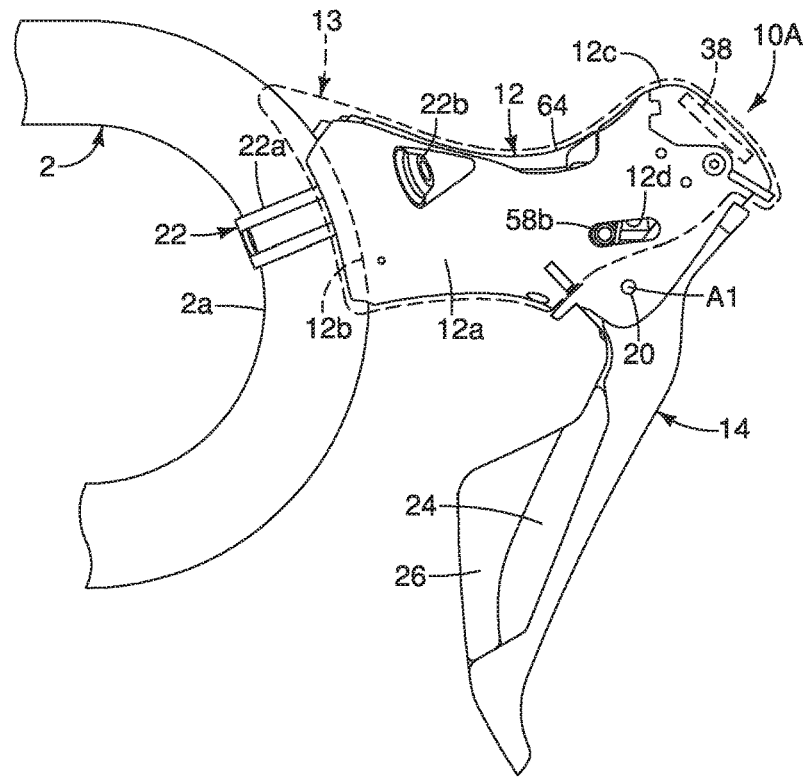
FIG. 2 is an outside elevational view of the right bicycle operating device illustrated in FIG. 1 with operating members in their rest (non-operated) positions.
Figure 3:
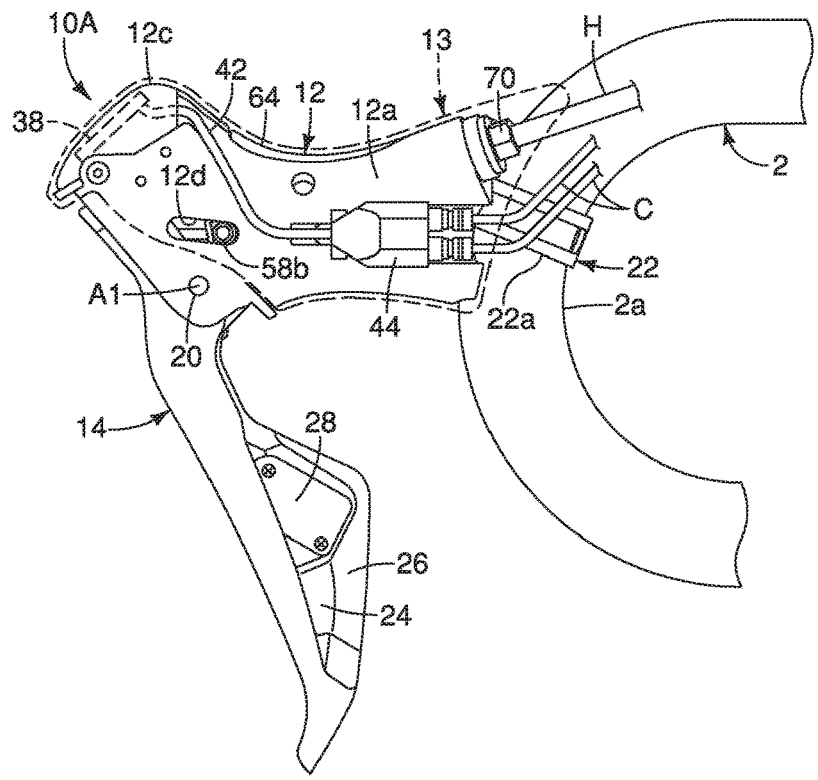
FIG. 3 is an inside elevational view of the right bicycle operating device illustrated in FIGS. 1 and 2 with the operating members in their rest (non-operated) positions.

As seen in FIGS. 2 and 3, the bicycle operating device 10A basically comprises a bracket 12 and an operating member 14. The operating member 14 is pivotally mounted to the bracket 12 about a first axis A1. In particular, the operating member 14 is pivotally mounted to the bracket 12 by a lever shaft 20 that defines the first axis A1. The lever shaft 20 is disposed in a left-to-right direction substantially perpendicular to a travel direction of the bicycle 1. The bracket 12 is configured to be coupled to the handlebar 2. In particular, as discussed below, the bracket 12 is mounted to the curved section 2a of the handlebar 2 by a handlebar mounting clamp 22.

Figure 6:
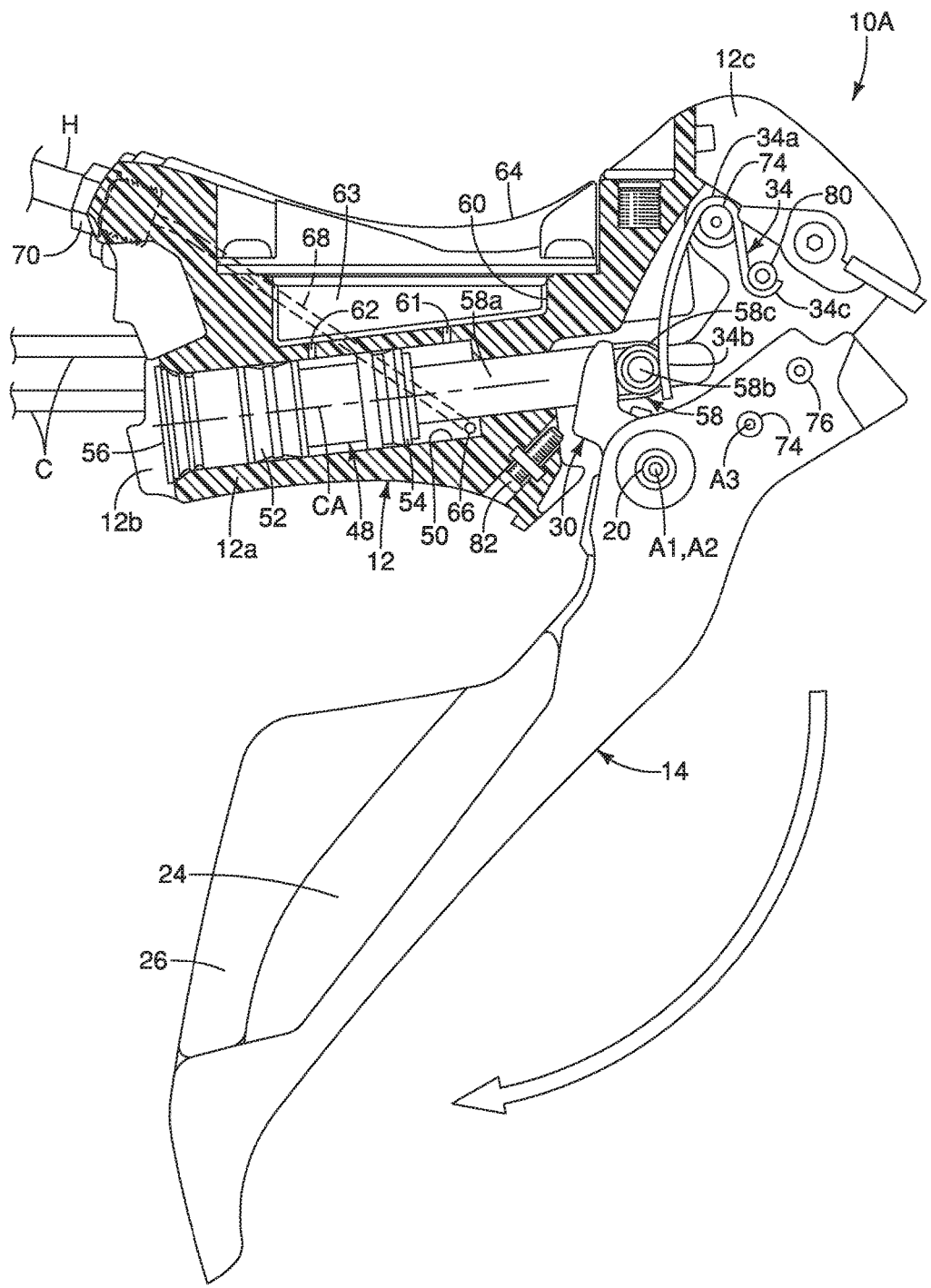
FIG. 6 is a partial cross sectional view of the right bicycle operating device illustrated in FIGS. 1 to 5 with the main operating member moved to an operated (braking) position.
Figure 7:
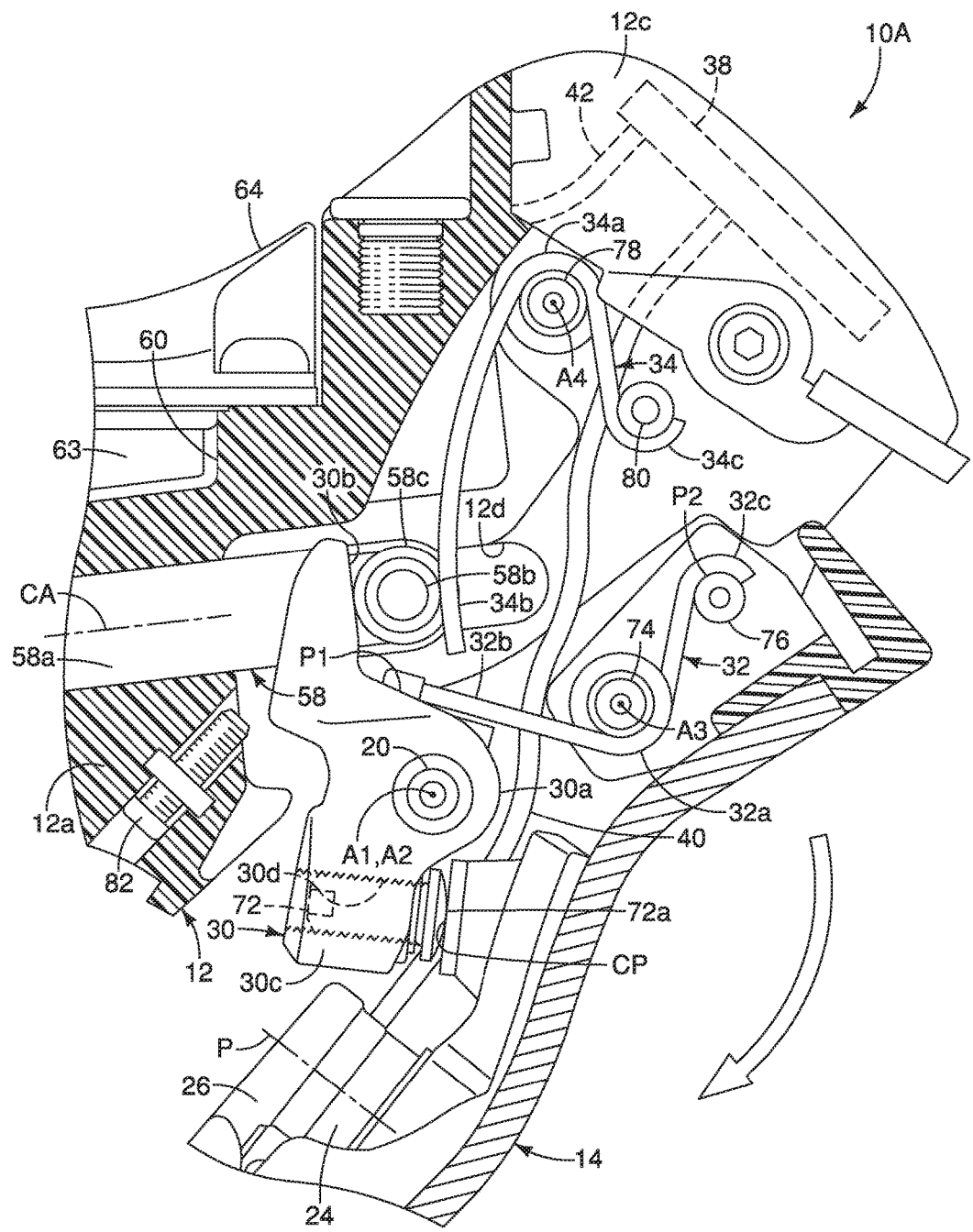
FIG. 7 is an enlarged partial cross sectional view of the distal end portion of the right bicycle operating device illustrated in FIG. 6 with the main operating member moved to an operated (braking) position.

The operating member 14 is an elongated operating (brake) lever that is pivotally mounted to the bracket 12 for performing a bicycle braking operation as illustrated in FIGS. 6 and 7. Here, as seen in FIGS. 2 and 3, the operating member 14 is provided with a first shift operating member 24, a second shift operating member 26 and a movement detector 28. The movement detector detects movement of the first and second shift operating members 24 and 26. The movement detector 28 can be either a press type contact switch or a contactless switch that is normally open (i.e. no power being transmitted therethrough).

Figure 5:
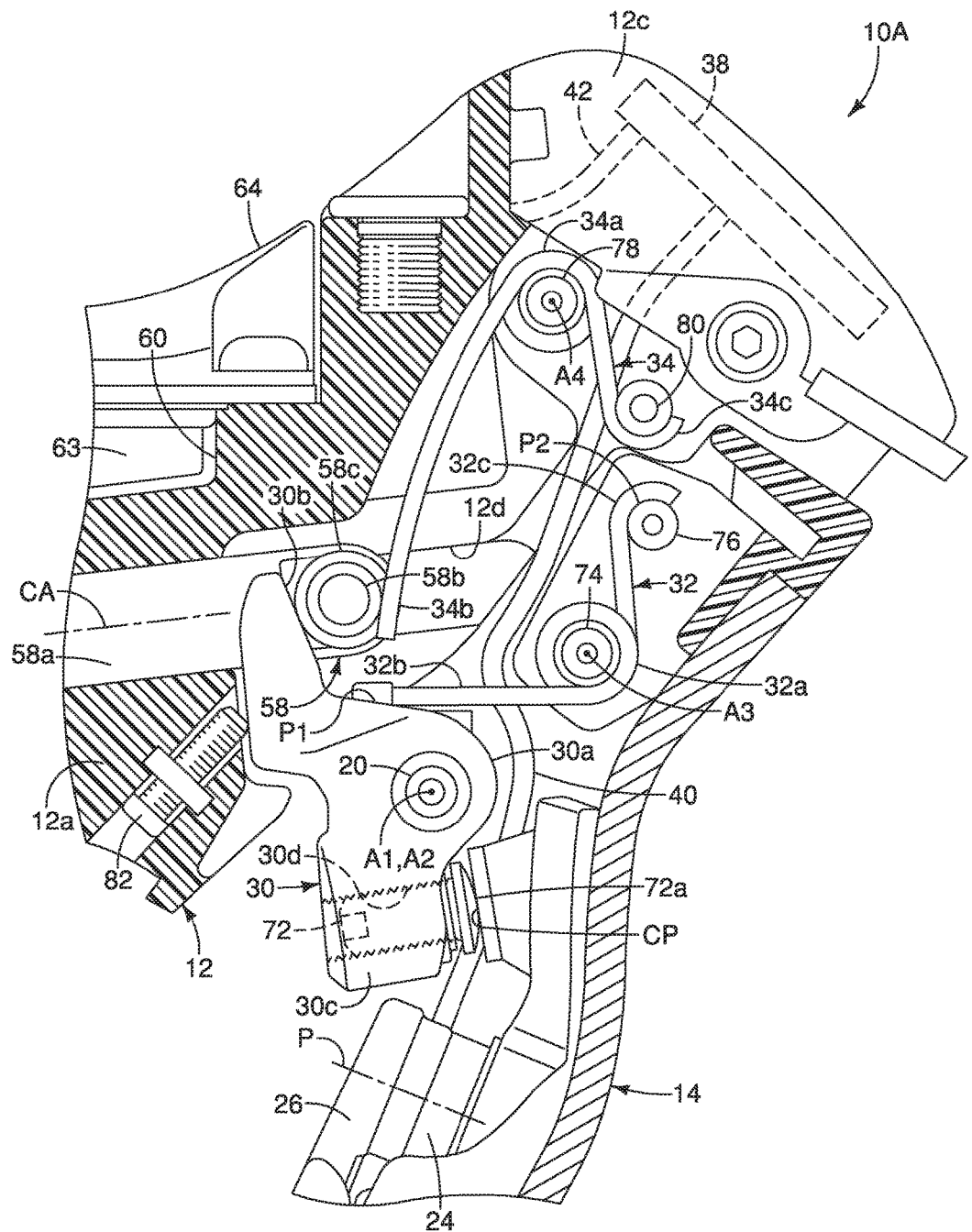
FIG. 5 is an enlarged partial cross sectional view of a distal end portion of the right bicycle operating device illustrated in FIG. 4 with the operating members in their rest (non-operated) positions.

As seen in FIG. 5, the bicycle operating device 10A further comprises an actuation cam 30 and a first biasing element 32. The first biasing element 32 is operatively coupled between the operating member 14 and the actuation cam 30 to bias the operating member 14 and the actuation cam 30 into contact with each other. Preferably, the bicycle operating device 10A further comprises a second biasing element 34 that is operatively arranged to bias the operating member 14 and the actuation cam 30 towards a rest position. The term "rest position" as used herein refers to a state in which the part (e.g., the operating member 14, the first shift operating member 24 and the second shift operating member 26) remains stationary without the need of a user holding the part in that state corresponding to the rest position. Here, the first biasing element 32 and the second biasing element 34 are, for example, metal springs, which are discussed below.

Figure 8:
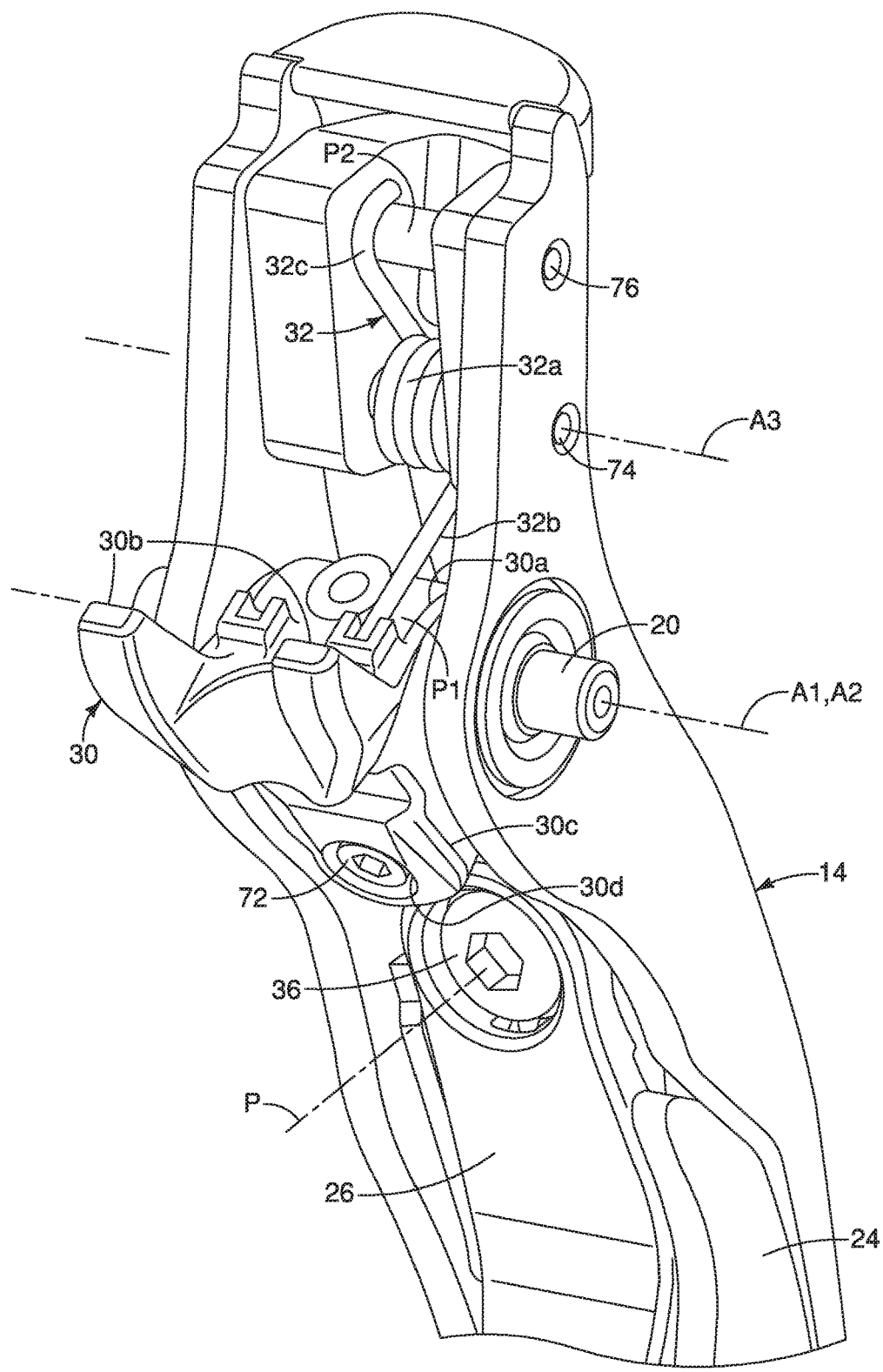
FIG. 8 is a partial rear side perspective view of an upper end portion of main operating member for the right bicycle operating device illustrated in FIGS. 1 to 7 as viewed parallel to a center axis of the adjustment screw.

As seen in FIGS. 5 and 7, the first and second shift operating members 24 and 26 are pivotally coupled to the operating member 14 about a pivot axis P. The first and second shift operating members 24 and 26 are trigger type of levers that are biased to their rest positions by springs (not shown). In the illustrated embodiment, the first and second shift operating members 24 and 26 are levers that are pivotally attached to the back or rearward facing side of the operating member 14 by a fastener 36 as best seen in FIG. 8. In other words, the first and second shift operating members 24 and 26 are movably mounted relative to the bracket 12 along operating paths or planes that are transverse to the pivot axis P. In the illustrated embodiment, the operating paths of the first and second shift operating members 24 and 26 are generally perpendicular to the brake operating plane of the operating member 14.

In the first illustrated embodiment, the first and second shift operating members 24 and 26 are independently operated relative to the operating member 14. In other words, when the first shift operating member 24 is pivoted, the second shift operating member 26 remains in a stationary position (rest position). Likewise, when the second shift operating member 26 is pivoted, the first shift operating member 24 remains in a stationary position (rest position). Of course, other configurations of the first and second shift operating members 24 and 26 are possible with some modifications as will be apparent from this disclosure. For example, the first and second shift operating members 24 and 26 could be arranged such that the first and second shift operating members 24 and 26 move together with respect to the bracket 12 and the operating member 14 as the first shift operating member 24 is operated, and the first shift operating member 24 remains stationary as the second shift operating member 26 is moved with respect to the bracket 12 and the operating member 14. In other words, in this alternative configuration, when the second shift operating member 26 is operated, only the second shift operating member 26 pivots with respect to the bracket 12 and the operating member 14. Of course, a construction achieving opposite movements of first and second shift operating members with respect to this movements can be selected as needed and/or desired.

Here, the bracket 12 constitutes a base member that is made of a rigid, hard material such as a hard rigid plastic material or a metallic material. For example, the bracket 12 can be made of a synthetic resin such as a polyamide resin (as shown), or a metal such as aluminum. The bracket 12 has a grip portion 12a with a handlebar receiving recess 12b. The operating member 14 is disposed at an opposite end of the grip portion 12a from the handlebar receiving recess 12b. The handlebar receiving recess 12b is a curved recess that curves so as to following the curved section 2a of the handlebar 2. The handlebar receiving recess 12b is formed on a first end of the bracket 12. A top or upper surface of the grip portion 12a has a downward-curving shaped surface to facilitate gripping of the grip portion 12a by a rider's hand. Typically, an elastomeric grip cover 13 is stretched over at least the grip portion 12a of the bracket 12 to provide a cushion to the grip portion 12a and to provide an attractive appearance. The bracket 12 is mounted to the curved section 2a of the handlebar 2 by the handlebar mounting clamp 22. The handlebar mounting clamp 22 is a conventional band-clamp that includes a band 22a and a fastener 22b as seen in FIGS. 1 and 2. The bracket 12 can be fixed to the handlebar 2 by turning a fastening bolt to clamp the handlebar 2 between a band 22a and the handlebar receiving recess 12b. The band 22a is disposed in the handlebar receiving recess 12b at the rear end of the bracket 12. The handlebar mounting clamp 22 and the handlebar receiving recess 12b constitute a handlebar mounting structure for mounting the bracket 12 to the handlebar 2.

As seen in FIGS. 4 to 7, the bracket 12 further has a pommel portion 12c that is disposed at the opposite end of the grip portion 12a from the handlebar receiving recess 12b. Here, as seen in FIGS. 5 and 7, the pommel portion 12c houses a built in controller 38. The controller 38 is electrically connected to the movement detector 28 by a first electrical wire 40 (see FIGS. 5 and 7). As seen in FIG. 3, the controller 38 has a second electrical wire 42 with an electrical connector 44 for connected to the electric control cables C. The controller 38 is programmed to process signals from the movement detector 28 as a result of the operation of the first shift operating member 24 and/or the second shift operating member 26. The controller 38 includes a processor that transmits data to the transmission and/or a cycle computer via the second electrical wire 42 and the electric control cables C.

While the controller 38 is illustrated as communicating with a bicycle component (not shown) via the second electrical wire 42 and the electric control cables C, it will be apparent to those skilled in the bicycle field that the controller 38 can wirelessly communication with a bicycle component (not shown) if desired. In other words, the bicycle operating device 10A can be provided with a wireless communication unit (e.g., a wireless transmitter). The wireless communication unit can be provided in the bracket 12 (e.g., in the pommel portion 12c adjacent the controller 38) or on one of the first and second shift operating members 24 and 26. In this way, the wireless communication unit can wirelessly transmit the shift signals and/or other data of the controller 38 that are produced by operation of the first shift operating member 24 and/or the second shift operating member 26.

Figure 4:
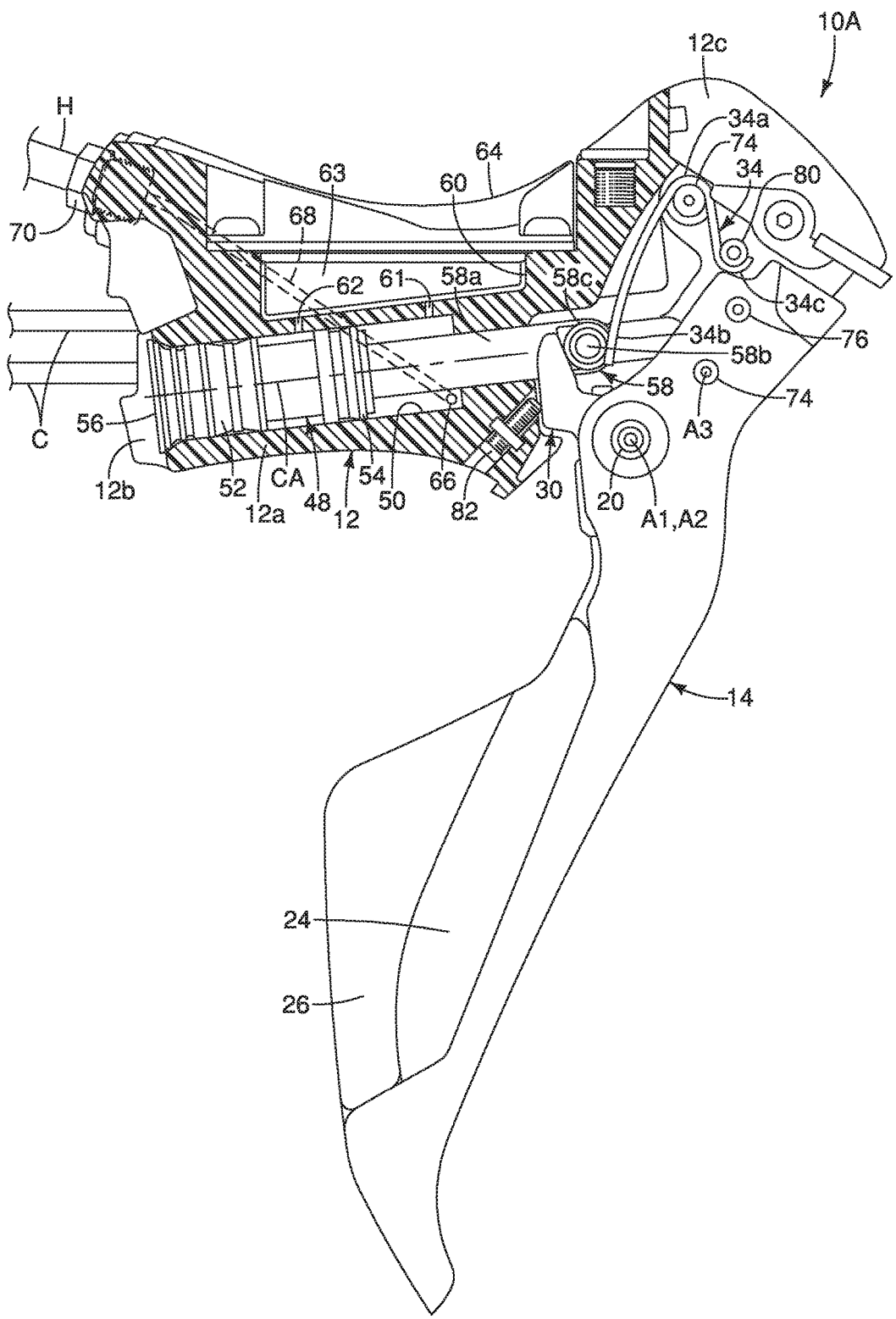
FIG. 4 is a partial cross sectional view of the right bicycle operating device illustrated in FIGS. 1 to 3 with a portion of the bracket shown in cross section and the operating members in their rest (non-operated) positions.

As seen in FIGS. 4 and 6, the bicycle operating device further comprises a piston 48. The piston 48 is a substantially cylindrical member. The piston 48 is movably disposed in a hydraulic chamber 50 of the bracket 12 in response to operation of the operating member 14. The piston 48 moves linearly within the hydraulic chamber 50 (i.e., reciprocates linearly within the hydraulic chamber 50). Here, the hydraulic chamber 50 is defined by a bore formed in the bracket 12. Thus, preferably, the hydraulic chamber 50 is formed integrally with the bracket 12. The hydraulic chamber 50 can be formed, for example, by cutting the bracket 12 or die molding of the bracket 12. The hydraulic chamber 50 is formed in a cylindrical shape having a cylinder axis CA. Alternatively, the hydraulic chamber 50 can be a separate member that is installed in the bracket 12.

The piston 48 has a first seal member 52 and a second seal member 54 installed on the outer circumferential surface of the piston 48. The first and second seal members 52 and 54 are provided in order to seal the gap between the inner circumferential surface of the hydraulic chamber 50 and the outer circumferential surface of the piston 48. The first and second seal members 52 and 54 have, for example, an O-ring shape. Thus, the first and second seal members 52 and 54 constitute sealing rings to contain hydraulic unit in the hydraulic chamber 50.

One end of the hydraulic chamber 50 is closed by a plug 56, while a connecting rod 58 extends out of the other end of the hydraulic chamber 50. The piston 48 is connected to the connecting rod 58 such that the connecting rod 58 and the piston 48 move together as a unit. Preferably, the bracket 12 further includes a reservoir 60 that is fluidly coupled to the hydraulic chamber 50 by a first inlet port 61 and a second inlet port 62. A diaphragm 63 is provided in the reservoir 60. The grip portion 12a of the bracket 12 includes a reservoir cover 64 that at least partly forms the upper surface of the grip portion 12a. The reservoir 60 is provided so that the necessary amount of hydraulic fluid can be injected from the reservoir 60 even if the friction material (for example, a brake pad) of the braking device becomes worn. In particular, the amount of hydraulic fluid needed in the hydraulic chamber 50 increase as the friction material of the braking device becomes worn. Also, the reservoir 60 prevents inconsistencies in the pressure being applied to the braking device due to swelling and contraction caused by changes in the temperature of the hydraulic fluid. Hydraulic pressure is generated through the movement of the piston 48 in response to operation of the operating member 14. The hydraulic chamber 50 is provided with an outlet port 66 (see FIGS. 4 and 6) that is fluidly connected to a hydraulic fluid channel 68 (see FIGS. 4 and 6). A hydraulic hose connector 70 is screwed into the bracket 12 to fluidly connect the hydraulic hose H to the hydraulic fluid channel and thus to the hydraulic chamber 50.

As seen in FIGS. 4 and 6, the piston 48 is operatively coupled to the operating member 14 via the actuation cam 30. In the illustrated embodiment, the connecting rod 58 mechanically couples the actuation cam 30 to the piston 48 so that movement of the operating member 14 is transmitted to the piston 48. In particular, the piston 48 moves linearly within the hydraulic chamber 50 (i.e., reciprocates linearly within the hydraulic chamber 50) to force the hydraulic fluid out of the outlet port of hydraulic chamber 50 to a brake device via the hydraulic hose H.

The connecting rod 58 has a rod body 58a, a guide shaft 58b and a pair of rollers 58c. The rod body 58a is a rod-shaped member that has a first end fixed to the piston 48, and a second end protruding out of the hydraulic chamber 50. A seal member (not shown) is provided between the rod body 58a and a through hole of the bracket 12 through which the rod body 58a passes. The guide shaft 58b is attached to the rod body 58a, and extends perpendicularly with respect to the longitudinal axis of the rod body 58a. The two free ends of the guide shaft 58b engage with a pair of guide grooves provided in the bracket 12. The rollers 58c are attached to the guide shaft 58b so as to be freely rotatable. The actuation cam 30 is pressed against the rollers 58c by the second biasing element 34.

Figure 9:
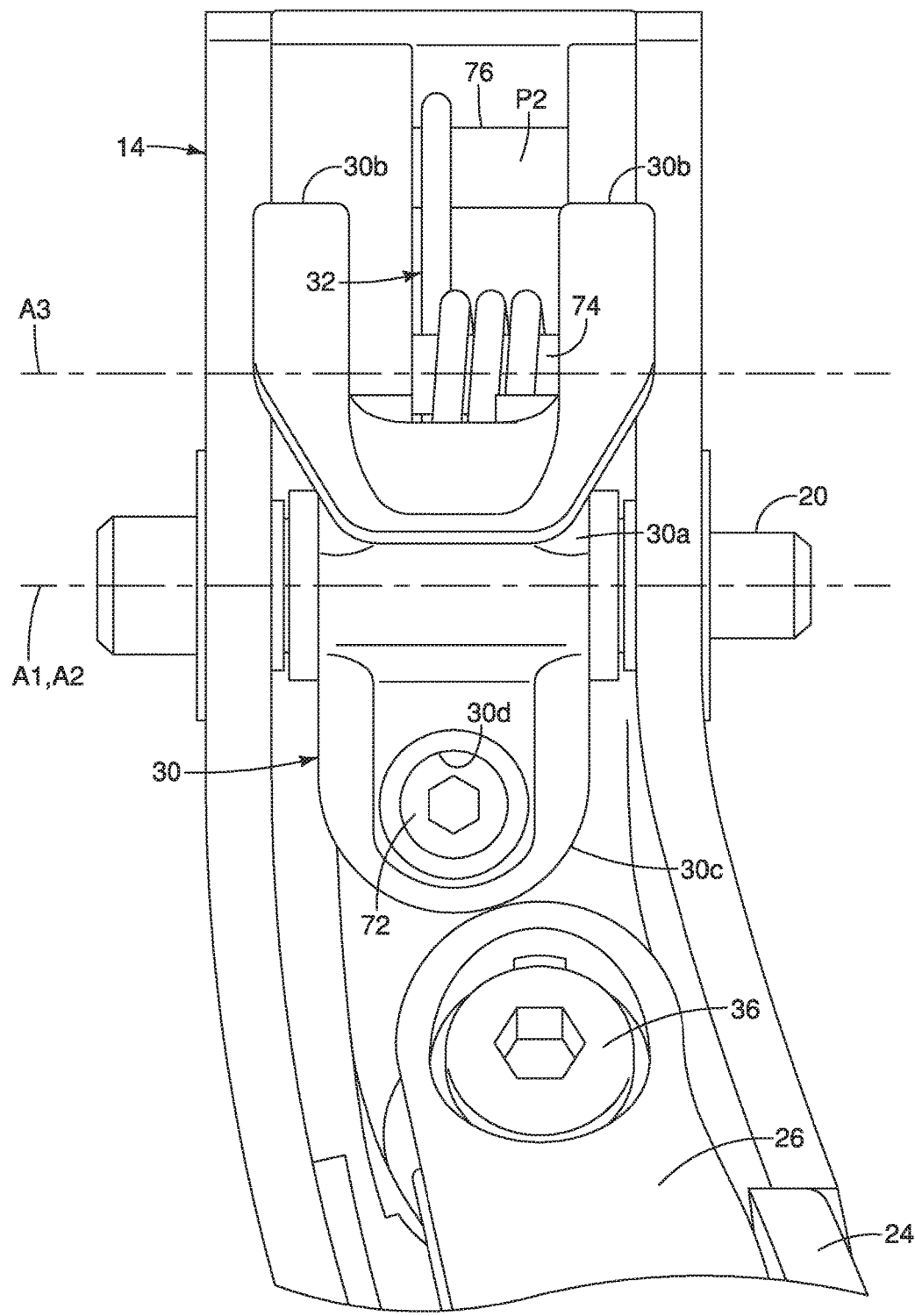
FIG. 9 is a partial rear side view of the upper end portion of main operating member for the right bicycle operating device illustrated in FIGS. 1 to 7.

As shown in FIGS. 4 to 7, the actuation cam 30 pivots around the first axis A1 and moves the connecting rod 58 and the piston 48 in response to the pivoting of the operating member 14 around the first axis A1. As seen in FIGS. 8 and 9, the actuation cam 30 has a coupling part 30a, a pair of camming parts 30b and a lever contact part 30c. Here, the actuation cam 30 is made of a rigid, hard material such as a hard rigid plastic material or a metallic material. The coupling part 30a is pivotally disposed on the lever shaft 20. In this way, the actuation cam 30 is pivotally mounted to the bracket 12 about a second axis A2. In other words, the actuation cam 30 is pivotally mounted to the bracket 12 by the lever shaft 20 defines the second axis A2. The camming parts 30b is arranged above the lever shaft 20 defining the first axis A1 and the second axis A2. The camming parts 30b engage the rollers 58c of the connecting rod 58 to transmit the movement of the actuation cam 30 to the connecting rod 58 and the piston 48. Thus, the actuation cam 30 is configured to move the piston 48 in the hydraulic chamber 50 in a direction towards the operating member 14 via the camming parts 30b. The lever contact part 30c of the actuation cam 30 contacts the operation member at a contact portion CP of the operation member 14. In this way, movement of the operation member 14 is transmitted to the actuation cam 30.

As seen in FIGS. 5 to 9, the bicycle operating device 10A further comprises an adjustment member 72 that is operatively coupled to the actuation cam 30 to adjust a rest position of the actuation cam 30 with respect to the operating member 14. In other words, the adjustment member 72 is configured to set a rest position of the actuation cam 30 with respect to the operating member 14. The adjustment member 72 is screwed into one of the operating member 14 and the actuation cam 30. Here in the illustrated embodiment, the adjustment member 72 is screwed into the actuation cam 30. In more detail, the adjustment member 72 is a screw that is screwed into a threaded bore 30d of the lever contact part 30c of the actuation cam 30. The tip end 72a of the screw forms a contact point of the lever contact part 30c of the actuation cam 30 that contacts the contact portion CP of the operating member 14. Thus, as the adjustment member 72 is screwed clockwise into the threaded bore 30d, the operating member 14 is rotated in a forward direction (i.e., counterclockwise about the first axis A1 in FIGS. 4 to 7). On the other hand, as the adjustment member 72 is screwed in a counterclockwise backing out of the threaded bore 30d, the operating member 14 is rotated in a rearward direction (i.e., clockwise about the first axis A1 in FIGS. 4 to 7).

As seen in FIGS. 5 to 9, the first biasing element 32 biases the operating member 14 relative to the bracket 12 about the first axis A1 toward the actuation cam 30. The first biasing element 32 includes a coil portion 32a disposed around a third axis A3 that is offset from the first axis A1. In particular, the coil portion 32a disposed around a mounting pin 74 that is mounted to the operating member 14. The first biasing element 32 includes a first end portion 32b and a second end portion 32c. The first end portion 32b extends from the coil portion 32a and applies a first biasing force to the actuation cam 30. The first end portion 32b has a straight shape that linearly extends from the coil portion 32a. The second end portion 32c extends from the coil portion 32a and applies a second biasing force to the operating member 14. The first biasing element 32 biases the actuation cam 30 relative to the bracket 12 about the second axis A2 toward the operating member 14. The second axis A2 is coincident with the first axis A1.

The first end portion 32b of the first biasing element 32 contacts the actuation cam 30 at a first portion P1 that pivots the actuation cam 30 about the second axis A2. The first portion P1 is farther from the contact portion CP than the first and second axes A1 and A2. The second end portion 32c of the first biasing element 32 contacts the operating member 14 at a second portion P2 that pivots the operating member 14 about the first axis A1. The second portion P2 is farther from the first and second axes A1 and A2 than the third axis A3. The second portion P2 includes a pin 76 provided on the operating member 14. The second end portion 32c has a hook shape corresponding to the pin 76 of the second portion P2. Here, the second end portion 32c is a hook shape member that has semicircular portion which catches on the pin 76. However, it will be apparent from this disclosure that the hook shape member of the second end portion 32c can be attached to other attachment structures of the operating member 14 such as hooked into an opening or onto a mating hook of the operating member 14.

As seen in FIGS. 5 and 7, the second biasing element 34 includes at least one spring that includes a coil portion 34a, a first end portion 34b and a second end portion 34c. The coil portion 34a is disposed around a mounting pin 78 that defines a fourth axis A4. The fourth axis A4 is offset from the first, second and third axes A1, A2 and A3. The first end portion 34b extends from the coil portion 34a and applies a first biasing force to the guide shaft 58b. The second end portion 34c extends from the coil portion 34a and applies a second biasing force to a stationary pin 80 that is mounted to the bracket 12. In this way, the second biasing element 34 biases the connecting rod 58 and the piston 48 towards a non-braking or non-actuated position. The second biasing element 34 biases the actuation cam 30 and the operating member 14 relative to the bracket 12 about the second axis A2 toward their rest positions.

As seen in FIGS. 5 and 7, the bicycle operating device 10A further comprises an adjustment member 82 that allows a rider to adjust a rest position of the connecting rod 58 and the piston 48 with respect to the bracket 12. However, the adjustment member 82 also adjusts simultaneously the rest positions of the operating member 14 and the actuation cam 30 with respect to the bracket 12.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle operating device. Accordingly, these directional terms, as utilized to describe the bicycle operating device should be interpreted relative to a bicycle in an upright riding position on a horizontal surface and that is equipped with the bicycle operating device. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle operating device comprising:
a bracket configured to be coupled to a handlebar;
an operating member pivotally mounted to the bracket about a first axis;
an actuation cam pivotally mounted to the bracket about a second axis; and
a biasing element including a coil portion disposed around a third axis that is offset from the first axis and biasing the operating member relative to the bracket about the first axis toward the actuation cam and biasing the actuation cam relative to the bracket about the second axis toward the operating member, the biasing element including a first end portion extending from the coil portion and applying a first biasing force to the actuation cam and a second end portion extending from the coil portion and applying a second biasing force to the operating member.

2. The bicycle operating device according to claim 1, wherein
the second axis is coincident with the first axis.

3. The bicycle operating device according to claim 1, wherein
the first end portion of the biasing element contacts the actuation cam at a first portion that pivots the actuation cam about the second axis.

4. The bicycle operating device according to claim 3, wherein
the actuation cam contacts the operation member at a contact portion,
the first portion is farther from the contact portion than the first and second axes.

5. The bicycle operating device according to claim 1, wherein
the first end portion has a straight shape linearly extending from the coil portion.

6. The bicycle operating device according to claim 1, wherein
the second end portion of the biasing element contacts the operating member at a second portion that pivots the operating member about the first axis.

7. The bicycle operating device according to claim 6, wherein
the second portion is farther from the first and second axes than the third axis.

8. The bicycle operating device according to claim 6, wherein
the second portion includes a pin provided on the operating member.

9. The bicycle operating device according to claim 8, wherein
the second end portion has a hook shape corresponding to the pin of the second portion.

10. The bicycle operating device according to claim 1, further comprising
a piston operatively coupled to the operating member via the actuation cam, and movably disposed in a hydraulic chamber of the bracket in response to operation of the operating member.

11. The bicycle operating device according to claim 10, wherein
the actuation cam is configured to move the piston in the hydraulic chamber in a direction towards the operating member.

12. The bicycle operating device according to claim 1, further comprising
an adjustment member operatively coupled to the actuation cam to adjust a rest position of the actuation cam with respect to the operating member.

13. The bicycle operating device according to claim 12, wherein
the adjustment member is screwed into one of the operating member and the actuation cam.

14. The bicycle operating device according to claim 13, wherein
the adjustment member is screwed into the actuation cam.

15. The bicycle operating device according to claim 1, wherein
the bracket has a grip portion with a handlebar receiving recess, and the operating member is disposed at an opposite end of the grip portion from the handlebar receiving recess.

16. The bicycle operating device according to claim 15, wherein
the bracket further has a pommel portion that is disposed at the opposite end of the grip portion from the handlebar receiving recess.

* * * * *